United States Patent

Ju

Patent Number: 5,957,600
Date of Patent: Sep. 28, 1999

[54] METHOD AND APPARATUS FOR PRINTING REDUCED SIZE OF IMAGE IN SERIAL PRINTER

[75] Inventor: Young-Bok Ju, Seongnam, Rep. of Korea

[73] Assignee: SamSung Electronics Co., Ltd., Suwon, Rep. of Korea

[21] Appl. No.: 08/872,768

[22] Filed: Jun. 5, 1997

[30] Foreign Application Priority Data

Jun. 5, 1996 [KR] Rep. of Korea ............ 96-20059

[51] Int. Cl.⁶ ............................................. B41J 29/18
[52] U.S. Cl. ............................................. 400/708; 400/76
[58] Field of Search ............... 400/708, 61, 76, 400/615.2, 279; 364/253; 358/435; 395/102

[56] References Cited

U.S. PATENT DOCUMENTS

| | | | |
|---|---|---|---|
| 4,505,579 | 3/1985 | Furuichi | 355/55 |
| 4,546,449 | 10/1985 | Masaki et al. | 364/523 |
| 4,572,650 | 2/1986 | Okuda | 355/35 H |
| 4,619,521 | 10/1986 | Miyamoto | 355/14 R |
| 4,647,189 | 3/1987 | Fujiwara et al. | 355/55 |
| 4,714,944 | 12/1987 | Yoshida | 355/55 |
| 4,789,879 | 12/1988 | Murakami | 400/120.01 |
| 4,954,846 | 9/1990 | Matsuo et al. | 355/311 |
| 5,029,114 | 7/1991 | Makiguchi | 364/523 |
| 5,127,752 | 7/1992 | Courney | 400/342 |
| 5,237,379 | 8/1993 | Sklut et al. | 355/311 |
| 5,258,812 | 11/1993 | Mahoney | 355/214 |
| 5,287,159 | 2/1994 | Sakakibara | 355/311 |
| 5,432,617 | 7/1995 | Sigishima | 358/435 |
| 5,498,087 | 3/1996 | Wey et al. | 400/708 |
| 5,603,578 | 2/1997 | Furuya | 400/279 |
| 5,613,045 | 3/1997 | Morimoto et al. | 395/102 |

FOREIGN PATENT DOCUMENTS 0 309 751  4/1989  European Pat. Off. ............ 400/708

OTHER PUBLICATIONS

Patent Abstracts of Japan No. 01271276 to ShimoJo entitled "Printing Apparatus" dated Oct. 30, 1989, one page.
Patent Abstracts of Japan No. 63128972 to Oota entitled "Recorder" dated Jun. 1, 1988, one page.
Patent Abstracts of Japan No. 63217464 to Watanabe entitled "Document Preparing Device" dated Sep. 9, 1988, one page.
Patent Abstracts of Japan No. 08046779 to Haze entitled "Image Recording Device" dated Feb. 16, 1996, one page.

*Primary Examiner*—Edgar Burr
*Assistant Examiner*—Charles H. Nolan, Jr.
*Attorney, Agent, or Firm*—Robert E. Bushnell, Esq.

[57] ABSTRACT

A method for printing a reduced size of image according to a paper width by detecting a paper width, which is made up of the steps of detecting a maximum size of printing data after receiving a printing data from a host computer, and printing a reduced printing data in case of a size of the printing data being larger than the paper width. A reflective optical sensor is moved over the paper so that the reflected state of an emitted light by the paper is used for detecting the width.

9 Claims, 3 Drawing Sheets

METHOD AND APPARATUS FOR PRINTING REDUCED SIZE OF IMAGE IN SERIAL PRINTER

CLAIM OF PRIORITY

This application makes reference to, incorporates the same herein, and claims all benefits accruing under 35 U.S.C. §119 from an application for Method For Printing Reduced Size of Image in Serial Printer earlier filed in the Korean Industrial Property Office on 5 Jun. 1996 and there duly assigned Ser. No. 20059/1996.

FIELD OF THE INVENTION

The present invention relates to an image forming device adopting serial printing method, and more particularly to a method and device for printing an image reduced according to paper width by sensing a width of print media.

BACKGROUND OF THE INVENTION

Generally an ink jet printer is a kind of serial printer printing sequentially, where a maximum printing width of a line is pre-set according to a print media. And the serial printer calculates a maximum number of printing dots corresponding to a maximum printing width of a print media. At this time, the serial printer performs the following two operations in case of a number of printing dots to be printed exceeds the maximum number of printing dots. Firstly, it performs line feed and prints the printing data not being printed because of exceeding the maximum printing width after finishing the line feed, and or it cancels the printing data not being printed.

Therefore the printed image is different from a user's edited image as the printing data exceeding the maximum printing width is printed in the next line or canceled. The inconvenience is solved by printing a reduced image without changing the picture image in case of exceeding the maximum printing width in a kind of serial printer such as a printer, model BJ-33 made by Canon. In the case, the size of printing data transferred to the serial printer is reduced by operating a paper form converting function key. For example, the size of printing data from a host computer is reduced by ratio of A3 to B4 in case of operating the function key of converting A3 paper form to B4 paper form. So the serial printer has the inconvenience for setting the printing width manually in advance by using the paper form converting function key by a user's recognition.

U.S. Pat. No. 4,647,189 for an Electrophotographic Copying Machine With Variable Magnification to Fujiwara discloses calculating the variable magnification ratio based upon both automatically sensing the copy document size information and manually inputting copy document size information when copying unformatted sized documents onto standard size copy paper. U.S. Pat. No. 4,789,879 for a Copier For Composite Copying With Automatic Magnification Adjusting Means to Murakami discloses a copier device for automatically correcting the magnification according to the change in the size of the copy paper caused by the proceeding copying process.

I have not seen a printer that determines the maximum print width of the original and uses that value to calculate the reduction ratio. I have also not seen the above used in combination with using an optical sensor to determine the width of the print media for calculating the reduction ratio.

SUMMARY OF THE INVENTION

It is an object to provide a method and an apparatus for automatically reducing the size of a printed image according to paper width by sensing a width of print media.

It is further an object to provide a method and apparatus for automatically reducing the size of a printed image according to the width of the maximum print data on an original document.

It is yet another object to use an optical method and apparatus to sense the width of the print media for purposes of calculating a reduction ratio by which an image is to be reduced.

According to the present invention, a method for printing a reduced size of an image according to the detected width of the print media is made up of the steps of detecting a maximum size of printing data after receiving printing data from a host computer and printing a reduced printing data in case the size of the printing data is larger than the print media width. In one aspect of the present invention, a reflective optical sensor is moved over the print media so that the reflected state of an emitted light by the print media is used for detecting the width of the print media.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
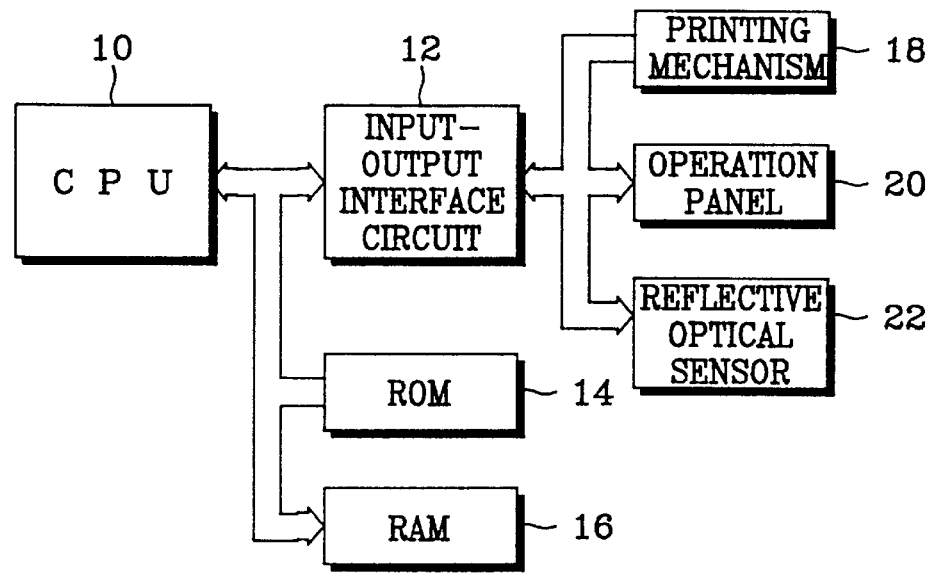
FIG. 1 illustrates a block diagram of a serial printer for printing a image data to be reduced by considering a paper form width according to the present invention.

Referring to FIG. 1, a central processing unit (hereinafter referred to as 'CPU') 10 controls all printing devices by executing a program stored in ROM 14 and using an input/output interface 12. The ROM 14 stores a performance program and all sorts of initial data of CPU 10. The RAM 16 temporarily stores data according to an operation of the CPU 10. An input/output interface 12 interfaces signals transferred between CPU 10 and input/output devices such as an operation panel 20, a printing mechanism 18 and a reflective optical sensor 22.

The operation panel 20 is made up of multiple of keys for giving instructions to the CPU 10 and a display for displaying all sorts of conditions of the CPU 10. The printing mechanism 18 is made up of a motor driver, a carrier moving motor, a print media moving motor, a head cradle, a head cartridge and a head driver, and it prints input data on a paper by control of the CPU 10. The reflective optical sensor 22 is installed on the head cradle of the printing mechanism 18.

Figure 2:
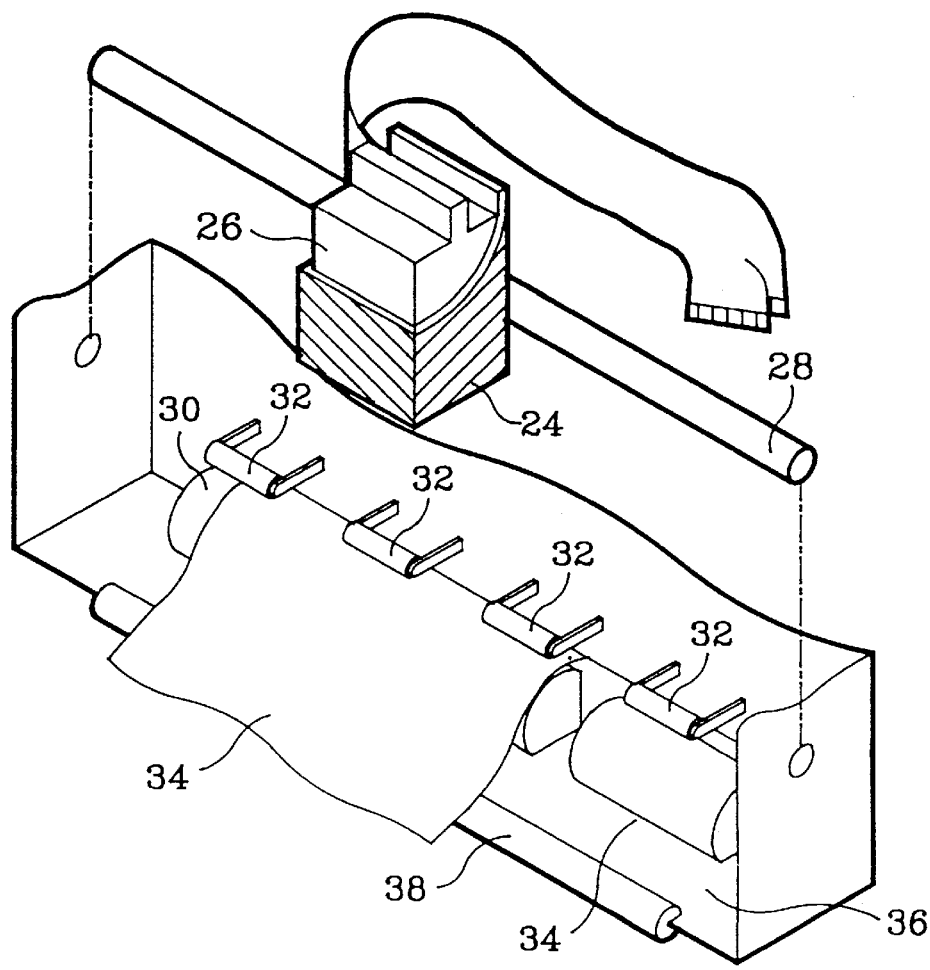
FIG. 2 illustrates a front exploded view of printing mechanism shown in FIG. 1.

Referring to FIG. 2, a feed roller 30 moves paper 34 to base frame assembly 36. A friction roller array 32 is installed on the feed roller 30. The friction roller array 32 prevents the paper 34 from getting loose while moving to the base frame assembly 36 by pressing on paper 34. Paper 34 is moved forward by a forward roller 38 of the base frame assembly 36. The carrier assembly is located vertically above the base frame assembly 36. The carrier assembly is made up of the head cradle 24 having a built-in head cartridge 26. The head cradle 24 is moved along a carrier shaft 28 by a carrier moving motor not illustrated in FIG. 2. The head cartridge 26 built in the head cradle 24 is made up of an ink barrel and an ink injection head.

The injection head located on the bottom of the head cradle 24 contacts slightly with the base frame assembly 36. Accordingly, the head prints data on the paper moved to the base frame assembly 36 by injecting ink. The reflective optical sensor 22 is installed on the bottom of the head cradle 24. The reflective optical sensor 22 is made up of a luminous element emitting a light on the paper 34 or the base frame assembly 36 and a receiver receiving a light reflected from the paper 34.

Figure 3:
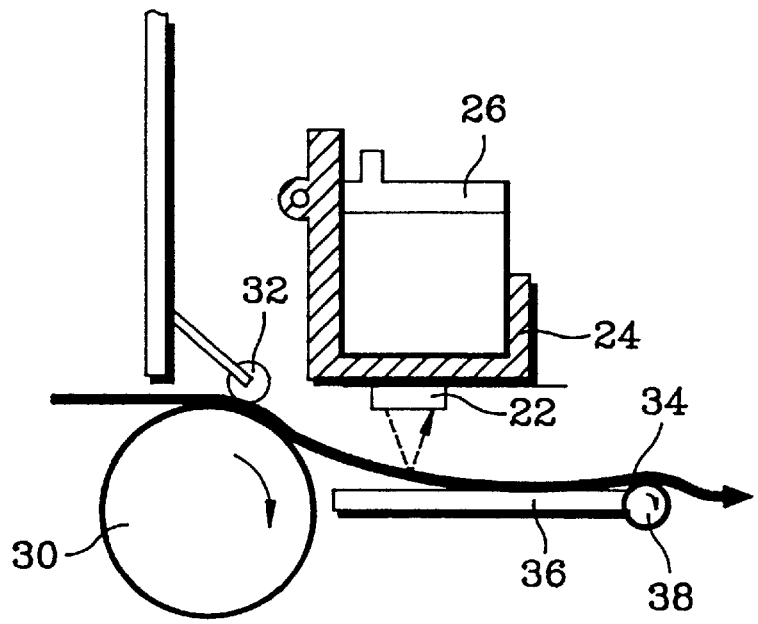
FIG. 3 is a cross sectional view of FIG. 2 for illustrating an operation of a reflective optical sensor being positioning above a paper.

Referring to FIG. 3, the luminous element of the reflective optical sensor 22 emits a light and the receiver receives the reflected light from the paper 34, and accordingly the reflective optical sensor senses the existence of the paper 34 from head cradle 24.

Figure 4:
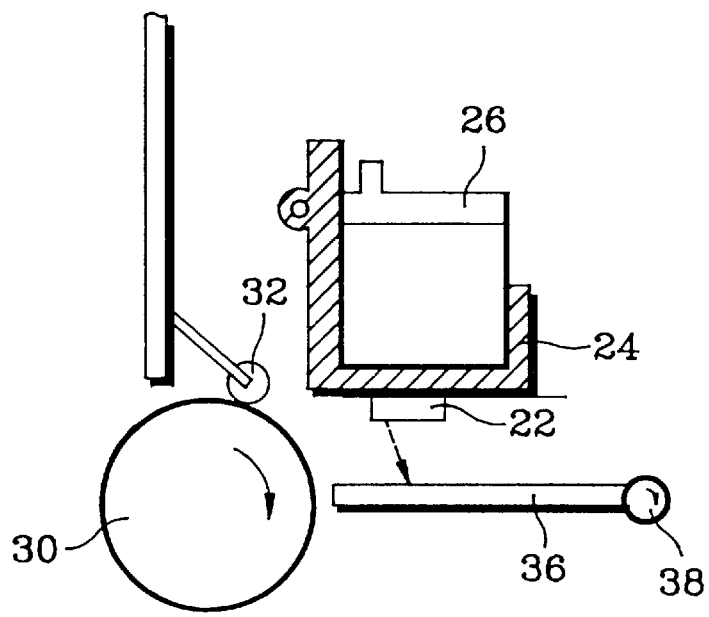
FIG. 4 is a cross sectional view of FIG. 2 with the head cradle and head cartridge added to illustrate the operation of a reflective optical sensor being positioning above a base frame assembly.

Referring to FIG. 4, the luminous element of the reflective optical sensor 22 emits a light to the base frame assembly 36 and the light is not reflected and absorbed into the base frame assembly 36 because of it being made from synthetic resin of black color, and accordingly optical sensor 22 senses non-existence of the paper 34. The head cradle 24 equipped with the reflective optical sensor 22 is moved along the carrier shaft 28. The step of detecting the paper width by the reflective optical sensor 22 is described as follows.

The CPU 10 loads the paper 34 on the position of printing after detecting the paper width and moves the head cradle 24 to a home position by driving the carriage moving motor after loading. At this time, the luminous element of the reflective optical sensor 22 starts to emit a light on the paper and the reflected light is received by the receiver. Receiving light, the CPU 10 moves the head cradle 24 horizontally from the home position to an end of the paper and counts dots to be printed while receiving the reflected light while the head cradle is being moved. The CPU 10 obtains the counted value corresponding to paper width when the light is not reflected any more in case of the head cradle 24 being moved to the position not having paper. Then the CPU 10 detects the paper width by obtaining the counted value.

Figure 5:
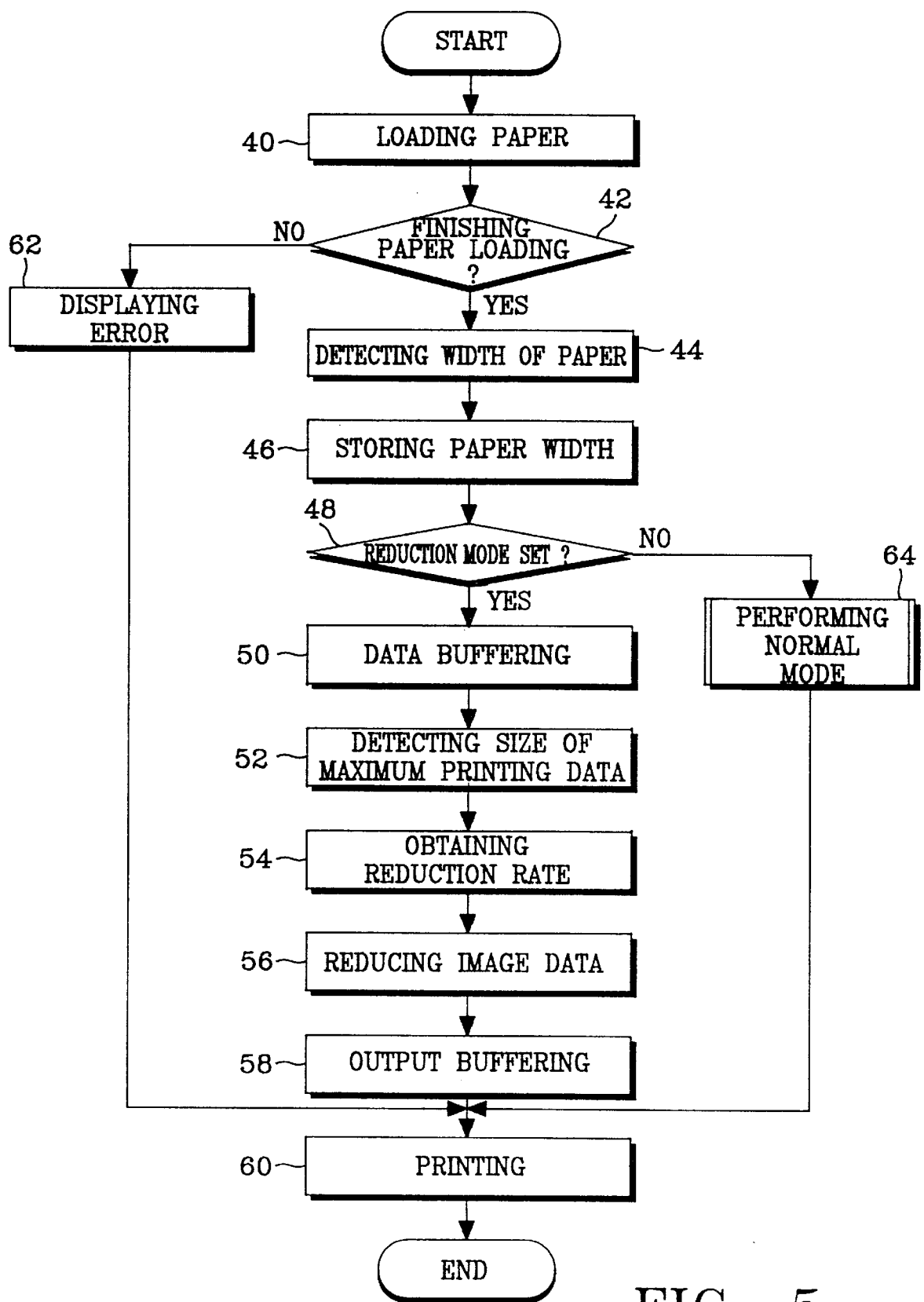
FIG. 5 is a flow chart for illustrating a method for reducing a printing image data corresponding to a paper width according to the present invention.

Referring to FIG. 5, the CPU 10 performs an initial state by applying power. After performing an initial state, the CPU 10 picks up and loads the paper 34 by driving a paper moving motor in step 40 and checks whether the paper is loaded by detecting whether an input is present in the reflective optical sensor 22 in step 42. When loaded, the emitted light is reflected on the paper 34 and received by the reflective optical sensor 22, and it is not reflected in case of the paper 34 being jammed or not being present. Accordingly the CPU 10 performs the step 44 when the reflected light is present and performs the step 62 when the reflected lighted is not present. The CPU 10 reads a data from the RAM 16 for displaying an error in step 62, and send the data to the operation panel 20 so as to display it. After displaying the error, the flow of operation is ended.

In step 44, the CPU 10 detects the paper width by using the reflective optical sensor 22. After detecting the paper width, the CPU 10 stores the detected paper width in RAM 16 in step 46. After storing the paper width, the CPU 10 detects whether data is transferred for setting the reduction mode by a function key in step 48. If there is no reduction, the CPU 10 performs the normal printing mode in step 64. If there is reduction, the function key for setting automatic reduction printing is operated at this time. The CPU 10 detects printing data from the host computer and operates an input buffer in case of the printing data being transferred in step 50. After buffering the printing data, the CPU 10 detects a number of columns per line from the printing data in step 52, and stores the maximum number of columns per line detected in a register.

The maximum number of columns per line represents the longest line among lines of one page in case the printing data equals the volume of one page. The maximum number of columns means the size of maximum printing data as the number of columns is proportional to the size of printing data. After detecting the size of maximum printing data, the CPU 10 reads the paper width stored in the RAM 16 and the size of maximum printing data stored in the register in step 54, and calculates a reduction ratio according to the read data. The formula of calculating the reduction ratio is as follows:

Reduction Ratio=Paper Width/Maximum Printing data×100%

After obtaining the reduction ratio, the CPU 10 reduces the buffered data according to the reduction ratio in step 56. At this time, the reduction can be performed by using a font ROM storing font image, where an image is formed by means of obtaining a letter reduced corresponding to the reduction ratio. Also an image sorting can be performed according to a reduction ratio of a reduction program. After reducing, the CPU 10 buffers the image into an output buffer in step 58. After buffering, the CPU 10 drives the printing mechanism 18 for printing a picture in step 60 corresponding to the buffer, and the flow of operation is ended at the time of ending a printing operation.

Accordingly the present invention solves the problem of losing the printing data excluded from the paper because of the printing data transferred from the host computer being larger than the paper width. Also it provides a convenience to print automatically a reduced size according to the sizes of data and paper without setting a reduction mode manually.

What is claimed is:

1. A method for printing an image according to a paper width, comprising the steps of:

detecting the width of loaded paper to obtain paper data as to a width of said loaded paper;

buffering printing data transferred from a host computer to provide buffered printing data;

detecting a maximum width of said printing data from said buffered printing data;

determining a reduction ratio by dividing said width of said loaded paper by said maximum width of said printing data if said maximum width of said printing data exceeds said width of said loaded paper so that said printing data can be printed entirely on one page of said loaded paper;

converting said printing to reduced image data according to said reduction ratio if said maximum width of said printing data exceeds the width of said loaded paper; and printing said printing data, said printing data being printed as a reduced image if said printing data is converted to said reduced image data.

2. The method of printing an image as defined in claim 1, further comprising the steps of:

detecting whether a reduction mode has been set by a user's key operation; and printing a reduced size image only when said reduction mode has been set.

3. The method of printing an image as defined in claim 1, further comprising the steps of transmitting and receiving light off said loaded paper to determine said width of said loaded paper.

4. A printer for printing a data image according to a width of a sheet of paper, comprising:

a controller operationally regulating overall operation of an image forming device through a prescribed control program with said controller receiving a maximum width of printing data for said data image and for converting said printing data to image data changed in size in dependence upon a determination of a ratio by dividing said width of said loaded paper by said maximum width of said printing data when said maximum width of said printing data fails to conform to said width of said paper, so that said printing accommodates formation of said data image entirely on the sheet of paper;

a memory storing program data of a control operation of said controller and data produced during said control operation, said control operation determining whether said printing data is to be converted to said image data changed in size, and said control operation for printing said data image;

an interface for interfacing input/output of data to said controller;

a printing head for printing on said paper;

a printing mechanism moving said printing head to print said data image on said paper under control of said controller through said interface; and a reflective optical sensor disposed to sense said width of said paper, wherein the data image to be printed is changed in size from an original image of said data image by said ratio.

5. A method for printing an image, comprising the steps of:

providing a print media and an original document, said print media having a width, and said original document having a maximum width of printed data;

determining the width of said print media;

determining the maximum width of the printed data on said original document;

determining a reduction ratio by dividing said width of said print media by said maximum width of said printed data on said original document if the maximum width of the printed data exceeds the width of said print media so that said printed data on said original document can be printed entirely on said print media; and printing an image for said original document on said print media, said image being a reduced size image according to said reduction ratio if the maximum width of the printed data exceeds the width of said print media.

6. The method of printing an image as defined in claim 5, further comprising the steps of transmitting and receiving light off said print media to determine said width of said print media.

7. The method for printing an image as defined in claim 1, wherein said maximum width of said printing data corresponds to the maximum number of columns per line for said printing data.

8. The printer according to claim 4, wherein said maximum width of said printing data corresponds to the maximum number of columns per line for said printing data.

9. The method for printing an image as defined in claim 5, wherein said maximum width of the printed data corresponds to the maximum number of columns per line for said printed data on said original document.

* * * * *